(12) United States Patent
Zumsteg

(10) Patent No.: US 9,081,994 B2
(45) Date of Patent: Jul. 14, 2015

(54) PORTABLE RFID READING TERMINAL WITH VISUAL INDICATION OF SCAN TRACE

(71) Applicant: Hand Held Products, Inc., Fort Mill, SC (US)

(72) Inventor: Philip Zumsteg, Shorewood, MN (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 43 days.

(21) Appl. No.: 13/744,447

(22) Filed: Jan. 18, 2013

(65) Prior Publication Data
US 2014/0097247 A1 Apr. 10, 2014

Related U.S. Application Data

(60) Provisional application No. 61/710,068, filed on Oct. 5, 2012.

(51) Int. Cl.
G06K 19/00 (2006.01)
G06K 7/00 (2006.01)
G06K 7/10 (2006.01)

(52) U.S. Cl.
CPC .......... G06K 7/0004 (2013.01); G06K 7/10099 (2013.01); G06K 7/10386 (2013.01)

(58) Field of Classification Search
USPC .................. 235/435, 439, 454, 462, 487, 492
See application file for complete search history.

(56) References Cited

U.S. PATENT DOCUMENTS

| | | | |
|---|---|---|---|
| 8,290,609 B2 | 10/2012 | Ikeda et al. | |
| 2012/0257025 A1 | 10/2012 | Kim et al. | |
| 2012/0257795 A1 | 10/2012 | Kim et al. | |
| 2012/0260163 A1 | 10/2012 | Kim et al. | |
| 2012/0260208 A1 | 10/2012 | Jung | |
| 2012/0262448 A1 | 10/2012 | Kim et al. | |
| 2012/0272231 A1 | 10/2012 | Kwon et al. | |
| 2012/0274581 A1 | 11/2012 | Kim | |
| 2012/0293427 A1 | 11/2012 | Mukai | |
| 2012/0293556 A1 | 11/2012 | Kim et al. | |
| 2012/0295634 A1 | 11/2012 | Kim | |
| 2012/0295672 A1 | 11/2012 | Kim | |
| 2013/0194077 A1* | 8/2013 | Vargas et al. | 340/10.6 |
| 2014/0025542 A1* | 1/2014 | Sharma et al. | 705/28 |

* cited by examiner

Primary Examiner — Matthew Mikels
(74) Attorney, Agent, or Firm — Oliff PLC; R. Brian Drozd

(57) ABSTRACT

An RFID reading terminal can be configured, responsive to receiving a user interface action, to capture an image of at least one part of a physical structure sustaining a plurality of inventory items, locate and decode optical decodable indicia into a message comprising an identifier of the physical structure. The RFID reading terminal can be further configured to retrieve from a database, using the identifier of the physical structure, a reference image and/or a description of the physical structure. The portable RFID reading terminal can be further configured, while being moved to follow an imaginary trajectory within the physical structure, to repetitively capture an image of the physical structure using the imaging device, determine orientation and the current spatial position of the RFID reading terminal relative to the physical structure responsive to identifying one or more objects within each captured image, and displaying the RFID scan trace.

18 Claims, 14 Drawing Sheets

CAMERA IMAGE - FRAME 1

CAMERA IMAGE - FRAME 2

CAMERA IMAGE - FRAME 3

PORTABLE RFID READING TERMINAL WITH VISUAL INDICATION OF SCAN TRACE

CROSS REFERENCE TO RELATED APPLICATIONS

This application claims priority to U.S. Provisional Application No. 61/710,068 filed Dec. 12, 2012 entitled, "Portable RFID Reading Terminal with Visual Indication of Scan Trace." The above application is incorporated herein by reference in its entirety.

FIELD OF THE INVENTION

The present disclosure is generally related to encoded information reading (EIR) terminals and is specifically related to RFID reading terminals including radio-frequency identification (RFID) reading devices.

BACKGROUND OF THE INVENTION

RFID methods are widely used in a number of applications, including smart cards, item tracking in manufacturing, inventory management in retail, etc. An RFID tag can be attached, e.g., to an inventory item. An RFID reading terminal can be configured to read the memory of an RFID tag attached to an inventory item.

The discussion above is merely provided for general background information and is not intended to be used as an aid in determining the scope of the claimed subject matter.

SUMMARY OF THE INVENTION

Systems are disclosed that in various embodiments include devices, methods, and/or software for providing visual indication of RFID scan trace by an RFID reading terminal. In one illustrative embodiment, there is provided a portable radio-frequency identifier (RFID) reading terminal comprising a processor, a memory, an RFID reading device, a two-dimensional imaging device, and a display. The portable RFID reading terminal described herein can be configured, responsive to receiving a user interface action, to capture an image of at least one part of a physical structure using the imaging device. The portable RFID reading terminal can be further configured, responsive to locating optical decodable indicia within the image, to decode the optical decodable indicia into a message comprising an identifier of the physical structure. The portable RFID reading terminal can be further configured to retrieve from a database, using the identifier of the physical structure, a reference image of the physical structure and/or a description of the physical structure. The portable RFID reading terminal can be further configured, while being moved to follow an imaginary trajectory within the physical structure, to repetitively perform the following steps: (i) capturing an image of the physical structure using the imaging device; (ii) responsive to identifying one or more objects within each captured image, determining an orientation and a current spatial position of the RFID reading terminal relative to the physical structure; and (iii) displaying on the display an RFID scan trace point defined by an intersection of a coverage shape of an RF signal transmitted by the RFID reading device and a chosen plane intersecting the physical structure. The RFID scan trace can be defined by a line comprising a plurality of time varying RFID scan trace points.

In a further aspect, the decodable indicia can be provided by a bar code.

In a further aspect, the message produced by decoding the decodable indicia can further comprise a description of the physical structure.

In a further aspect, the portable RFID reading terminal can be further configured, responsive to retrieving the description of the physical structure from the database, to determine and store in the memory own spatial position as a point of origin.

In a further aspect, the portable RFID reading terminal can be further configured, responsive to retrieving the reference image of the physical structure from the database, to display the image on the display.

In a further aspect, the portable RFID reading terminal can be further configured to identify the one or more objects within each captured image based on comparing the captured image to the reference image of the physical structure and/or the description of the physical structure.

In a further aspect, the portable RFID reading terminal can be further configured to determine the orientation and the current spatial position of the RFID reading terminal relative to the physical structure based on comparing two or more subsequently captured images of the physical structure.

In a further aspect, the portable RFID reading terminal can be further configured to determine the orientation and the current spatial position of the RFID reading terminal relative to the physical structure based on estimated distance to the physical structure.

In a further aspect, the visual cues can be provided by edges of the physical structure and/or two-dimensional objects on a surface of the physical structure.

In a further aspect, the database can be provided by a local database or a remote database residing on an external computer.

In a further aspect, the portable RFID reading terminal can be further configured to display the RFID scan trace overlaid over an image of a physical structure.

In another illustrative embodiment, there is provided a method of displaying a visual RFID scan trace by a portable RFID reading terminal including a processor, a memory, an RFID reading device, an imaging device, and a display. The method can comprise the steps of: (i) orienting the portable RFID reading terminal so that at least one part of a physical structure sustaining a plurality of inventory items appears in a field of view of the imaging device; (ii) the portable RFID reading terminal, responsive to receiving a user interface action, capturing an image of at least one part of a physical structure using the imaging device; (iii) the portable RFID reading terminal, responsive to locating optical decodable indicia within the image, decoding the optical decodable indicia into a message comprising an identifier of the physical structure; (iv) the portable RFID reading terminal retrieving from a database, using the identifier of the physical structure, a reference image of the physical structure and/or a description of the physical structure; the portable RFID reading terminal, while being to follow an imaginary trajectory within the physical structure, repetitively performing the following steps: (a) capturing an image of the physical structure using the imaging device; (b) responsive to identifying one or more objects within each captured image, determining an orientation and a current spatial position of the RFID reading terminal relative to the physical structure; and (c) displaying on the display a scan trace point defined by an intersection of a coverage shape of an RF signal transmitted by the RFID reading device and a chosen plane intersecting the physical structure.

In another illustrative embodiment, there is provided a method of displaying a visual RFID scan trace by a portable RFID reading terminal including a processor, a memory, an RFID reading device, an imaging device, and a display. The method can comprise the steps of: (i) orienting the portable RFID reading terminal so that at least one part of a physical structure sustaining a plurality of inventory items appears in a field of view of the imaging device; (ii) the portable RFID reading terminal, responsive to receiving a user interface action, capturing an image of at least one part of a physical structure using the imaging device; (iii) the portable RFID reading terminal, responsive to locating optical decodable indicia within the image, decoding the optical decodable indicia into a message comprising a description of the physical structure; (iv) the portable RFID reading terminal, while being to follow an imaginary trajectory within the physical structure, repetitively performing the following steps: (a) capturing an image of the physical structure using the imaging device; (b) responsive to identifying one or more objects within each captured image, determining an orientation and a current spatial position of the RFID reading terminal relative to the physical structure; and (c) displaying on the display a scan trace point defined by an intersection of a coverage shape of an RF signal transmitted by the RFID reading device and a chosen plane intersecting the physical structure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Radio-frequency identifier (RFID) reading devices usually offer improved efficiency over bar code scanning devices for retail inventory, by being capable of reading multiple RFID tags that are within range of the RF signal transmitted by an RFID reading device. A downside to this multiple-read capability is lack of scanned items localization, due to insufficient correlation between the position and orientation of the RFID reader and the location RFID tags being read.

At any moment in time, the RF signal coverage of an RFID reading terminal can be defined by a three-dimensional (3D) shape. The form and size of the 3D shape defining the RF signal coverage depends, among other factors, on the orientation of the RFID reading terminal, the RFID transmitter power level, and the number and configuration of the RF antennas employed by the RFID reading terminal. Hence, a target scan area of an RFID reading terminal can be visualized as an intersection of the 3D RF signal coverage shape and an arbitrarily chosen plane.

Figure 1:
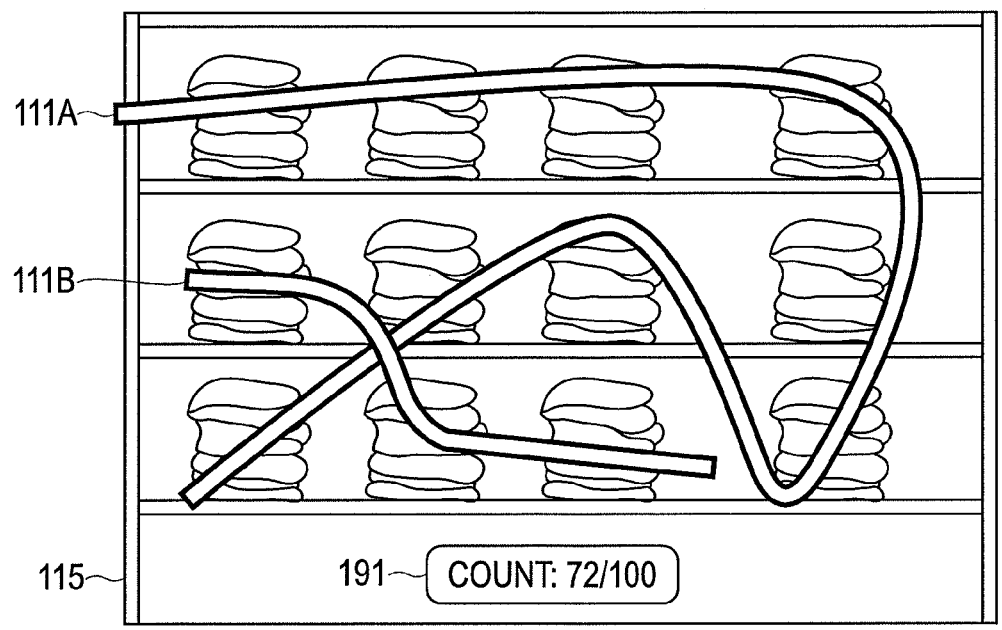
FIG. 1 schematically illustrates a scan trace displayed by an RFID reading terminal.

For a moving RFID reading terminal, a visual RFID scan trace can be provided by various graphical representations such as a solid line, continuous line, or a dotted line. Each line can be defined by a multitude of time varying points, each point being an intersection of the 3D RF signal coverage shape and an arbitrarily chosen plane, including an imaginary plane, at a given moment in time. The plane imaginary onto which the visual scan trace is projected can be chosen to intersect a physical structure containing a plurality of items to be inventoried, and thus the scan trace can be overlaid over an image of the physical structure, as schematically shown in FIG. 1.

In a further aspect, for an RFID reading terminal comprising a two-dimensional imaging device (e.g., a camera), the spatial position of the RF signal coverage shape can be determined based on the known orientation of the RF antenna relatively to the field of view of the imaging device. The position of the field of view can, in turn, be correlated to the surface of the physical structure over which the scan trace is overlaid, based on identifying one or more pre-defined objects (visual cues) within a sequence of images of the physical structure acquired by a moving RFID reading terminal.

In some embodiments, the visual cues can be based upon intrinsic features of the physical structure, such as edges, surface lines, and/or two-dimensional objects on the surface of the physical structure. The visual cues can also include custom two-dimensional objects mounted on the surface of the physical structure, such as labels containing decodable indicia (e.g., bar codes). The decodable indicia can be decoded into a message comprising an identifier of the physical structure in a local or remote database containing an image and/or a description of the physical structure.

Hence, in one embodiment, there is provided a portable RFID reading terminal configured to present a visual indication of the RFID scan trace. Various embodiments of the RFID reading terminal can be used in a numerous applications, including but not limited to, item tracking in manufacturing, storage, and retail, real-time inventory control systems, etc.

Item tracking and/or inventory control can be implemented by placing an RFID tag on each inventory item. The RFID reading terminal described herein can comprise at least one RFID reading device which can be configured to read and/or modify a memory of an RFID tag containing an encoded message. The RFID reading device can transmit and/or receive radio frequency (RF) signals to and from RFID tags attached to inventory items. Each RFID tag can store the tag identifier in its memory. An RFID tag attached to an inventory item can further store in the tag's memory a product code of the item, an EPC (Electronic Product Code) of the item, and/or at least one alphanumeric string identifying the item. The RFID reading device can be further configured to output decoded message data corresponding to the encoded message, e.g., decoded message data containing identifiers of the items to which the RFID tags are attached. The RFID reading terminal can be configured to store in its memory and/or transmit to an external computer the item identifiers received from the plurality of RFID tags.

In a further aspect, the RFID reading terminal can be configured to receive an expected count of inventory items or an expected inventory list of items of interest stored within a storage, manufacturing, and/or retail facility. As used herein, "inventory list" shall refer to a collection of item descriptions, each item description comprising at least the item identifier. In one embodiment, the RFID reading terminal can receive the expected count of inventory items or the expected inventory list over a network from an external computer. In another embodiment, the RFID reading terminal can receive the expected count of inventory items or the expected inventory list via the user interface. In a yet another embodiment, the RFID reading terminal can receive the expected count of inventory items or the expected inventory list by reading an external memory device connected to one of the terminal's I/O ports (e.g., a USB port, or a PCMCIA interface). In a yet another embodiment, the RFID reading terminal can receive the expected count of inventory items or the expected inventory list via a two-dimensional imaging device, for example, by scanning a plurality of optical decodable indicia (e.g., a plurality of bar codes), or by acquiring an image of a textual document containing the expected count of inventory items or the expected inventory list and then processing the image using optical character recognition (OCR) methods. The RFID reading terminal can be further configured to reconcile the inventory of items stored within a storage, manufacturing, and/or retail facility against the expected count of inventory items or the expected inventory list by reading the RFID tags attached to the inventory items.

Figure 2:
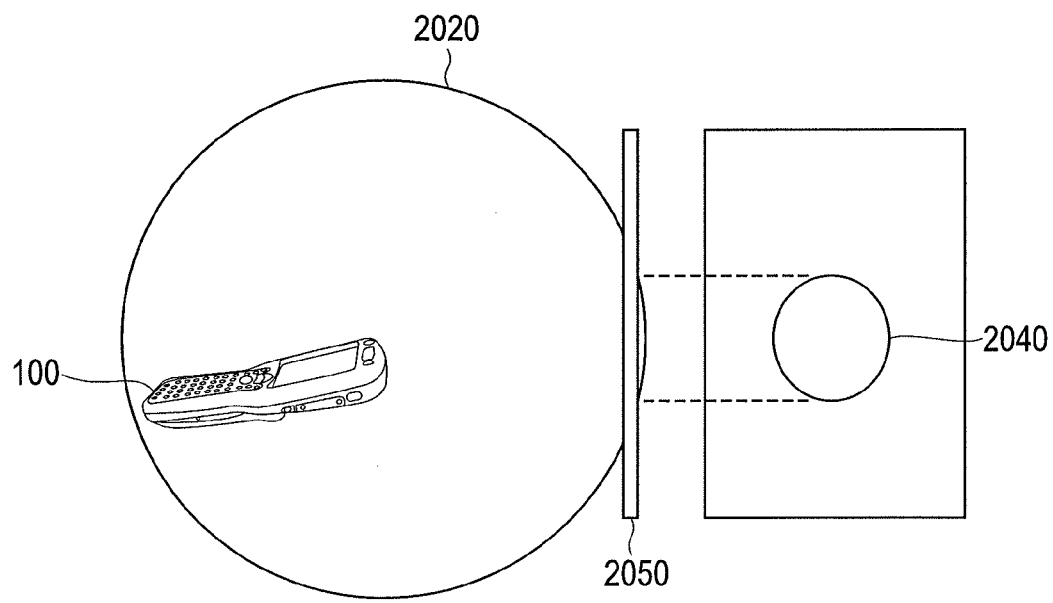
FIG. 2 schematically illustrates an RF signal coverage shape by the RFID reading terminal.

As noted herein supra, at any moment in time, the RF signal coverage of an RFID reading terminal can be defined by a 3D shape, as schematically shown in FIG. 2. The form and size of the 3D shape defining the RF signal coverage can depend, among other factors, on the RFID transmitter power level and the number and configuration of the RF antennas employed by the RFID reading device. In one embodiment, the 3D signal coverage shape can be provided by a sphere 2020. In another embodiment, the 3D signal coverage shape can be provided by an ellipsoid. In a yet another embodiment, the 3D signal coverage shape can be provided by a cone.

The target scan area of an RFID reading terminal can be visualized as an intersection 2040 of the 3D RF signal coverage shape 2020 and an arbitrarily chosen plane 2050, including an imaginary plane. For a moving RFID reading terminal, a visual scan trace can be provided by a line defined by a multitude of time varying points, each point being an intersection 2040 of the 3D RF signal coverage shape 2020 and the arbitrarily chosen plane 2050 at a given moment in time.

In a further aspect, the imaginary plane onto which the visual scan trace is projected can be chosen to intersect a physical structure (e.g., a shelf) containing the inventory items, and thus the scan trace can be overlaid over an image of the physical structure as schematically shown in FIG. 1.

Figure 3:
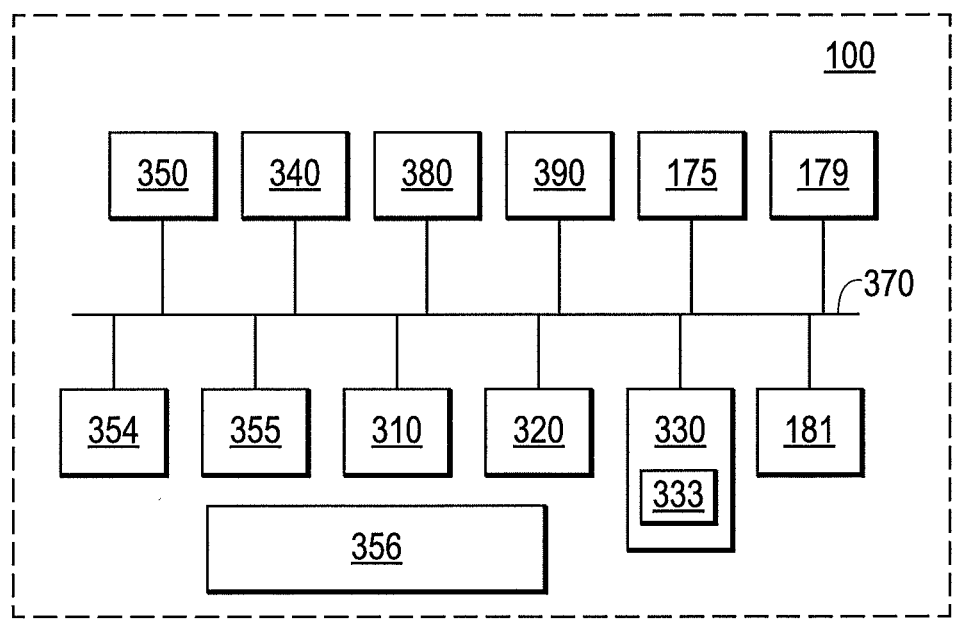
FIG. 3 schematically illustrates a component-level diagram of one embodiment of the RFID reading terminal.

Component-level diagram of one embodiment of the RFID reading terminal is now being described with references to FIG. 3. The RFID reading terminal 100 can comprise at least one microprocessor 310 and a memory 320, both coupled to the system bus 370. The microprocessor 310 can be provided by a general purpose microprocessor or by a specialized microprocessor (e.g., an ASIC). In one embodiment, RFID reading terminal 100 can comprise a single microprocessor which can be referred to as a central processing unit (CPU). In another embodiment, RFID reading terminal 100 can comprise two or more microprocessors, for example, a CPU providing some or most of the RFID reading terminal functionality and a specialized microprocessor performing some specific functionality. A skilled artisan would appreciate the fact that other schemes of processing tasks distribution among two or more microprocessors are within the scope of this disclosure.

RFID reading terminal 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

RFID reading terminal 100 can further comprise a battery 356. In one embodiment, the battery 356 can be provided by a replaceable rechargeable battery pack. The RFID reading terminal 100 can further comprise a GPS receiver 380. The RFID reading terminal 100 can further comprise at least one connector 390 configured to receive a subscriber identity module (SIM) card.

The RFID reading terminal 100 can further comprise an imaging device 330, provided, for example, by a two-dimensional imager.

The RFID reading terminal 100 can further comprise an RFID reading device 333. In one embodiment, the RFID reading device 333 can be configured to read a memory of an RFID tag containing an encoded message and to output raw message data containing the encoded message. In another embodiment, the RFID reading device 333 can be configured to read a memory of an RFID tag containing an encoded message and to output decoded message data corresponding to the encoded message. As used herein, "message" is intended to denote a bit sequence or a character string comprising alphanumeric and/or non-alphanumeric characters. An encoded message can be used to convey information, such as identification of the source and the model of an item, for example, in an EPC code.

In one embodiment, the RFID reading terminal 100 can further comprise a graphical user interface including a display adapter 175 and a keyboard 179. In one embodiment, the RFID reading terminal 100 can further comprise an audio output device, e.g., a speaker 181.

It is not necessary that a device's primary function involve reading RFID tags in order to be considered an RFID reading terminal; for example, a cellular telephone, a smart phone, a PDA, or other portable computing device that is capable of reading RFID tags can be referred to as an RFID reading terminal for purposes of this disclosure.

Figure 4:
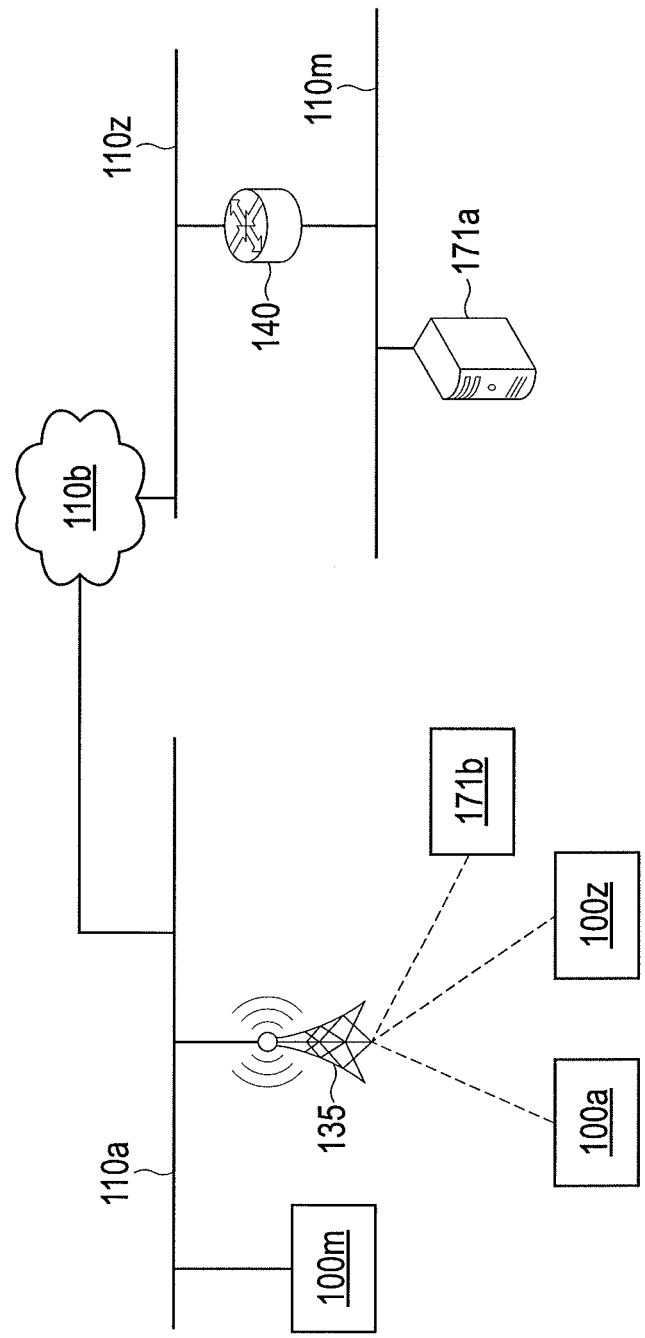
FIG. 4 schematically illustrates a network diagram of one embodiment of a data collection system employing RFID reading terminals.

In a further aspect, the RFID reading terminal 100 of FIG. 3 can be incorporated in a data collection system. One embodiment of the data collection system, schematically shown in FIG. 4, can include a plurality of RFID reading terminals 100a-100z in communication with a plurality of interconnected networks 110a-110z.

An RFID reading terminal 100a-100z can establish a communication session with an external computer 171. In one embodiment, network frames can be exchanged by the RFID reading terminal 100 and the external computer 171 via one or more routers 140, access points 135, and other infrastructure elements. In another embodiment, the external computer 171 can be reachable by the RFID reading terminal 100 via a local area network (LAN). In a yet another embodiment, the external computer 171 can be reachable by the RFID reading terminal 100 via a wide area network (WAN). In a yet another embodiment, the external computer 171 can be reachable by the RFID reading terminal 100 directly (e.g., via a wired or wireless interface). A skilled artisan would appreciate the fact that other methods of providing interconnectivity between the RFID reading terminal 100 and the external computer 171 relying upon LANs, WANs, virtual private networks (VPNs), and/or other types of network are within the scope of this disclosure.

A "computer" herein shall refer to a programmable device for data processing and control, including a central processing unit (CPU), a memory, and at least one communication interface. For example, in one embodiment, a computer can be provided by a server running a single instance of a multitasking operating system. In another embodiment, a computer can be provided by a virtual server, i.e., an isolated instance of a guest operating system running within a host operating system. A "network" herein shall refer to a set of hardware and software components implementing a plurality of communication channels between two or more computers. A network can be provided, e.g., by a local area network (LAN), or a wide area network (WAN). While different networks can be designated herein, it is recognized that a single network as seen from the application layer interface to the network layer of the OSI model can comprise a plurality of lower layer networks, i.e., what can be regarded as a single Internet Protocol (IP) network, can include a plurality of different physical networks.

The communications between the RFID reading terminal 100 and the external computer 171 can comprise a series of requests and responses transmitted over one or more TCP connections. A skilled artisan would appreciate the fact that using various transport and application level protocols is within the scope and the spirit of the invention.

At least one of the messages transmitted by the RFID reading terminal 100 can include decoded message data corresponding to an RFID label attached to an inventory item. For example, an RFID reading terminal can transmit a request to the external computer to retrieve product information corresponding to a product identifier encoded by an RFID tag attached to a retail item, or to transmit an item tacking record for an item identified by an RFID tag attached to the item.

As noted herein supra, the RFID reading terminal 100 can be configured to receive from the external computer 171 an inventory list containing item identifiers, or count, of items stored within a storage, manufacturing, and/or retail facility. The inventory list or count can further contain storage location information of specific items. The RFID reading terminal 100 can be further configured to reconcile an inventory of items stored in a manufacturing, retail and/or storage facility against the inventory list or count, by reading RFID tags attached to the items. The RFID reading terminal 100 can be configured to transmit the reconciled list or count to the external computer 171.

RFID reading terminal 100 can be configured to display a scan trace on the terminal's display, thus providing to the operator a visual feedback with respect to the scanning progress. In one embodiment, one or more scan traces 111a, 111b can be overlaid over an image of physical structure 115 containing the inventory items as schematically shown in FIG. 1. In a further aspect, for a moving RFID reading terminal, a visual scan trace can be provided by a line defined by a multitude of time varying points, each point being an intersection of the 3D RF signal coverage shape and a plane defined by the surface of the physical structure 115 containing the inventory items at a given moment in time.

Figure 5A:
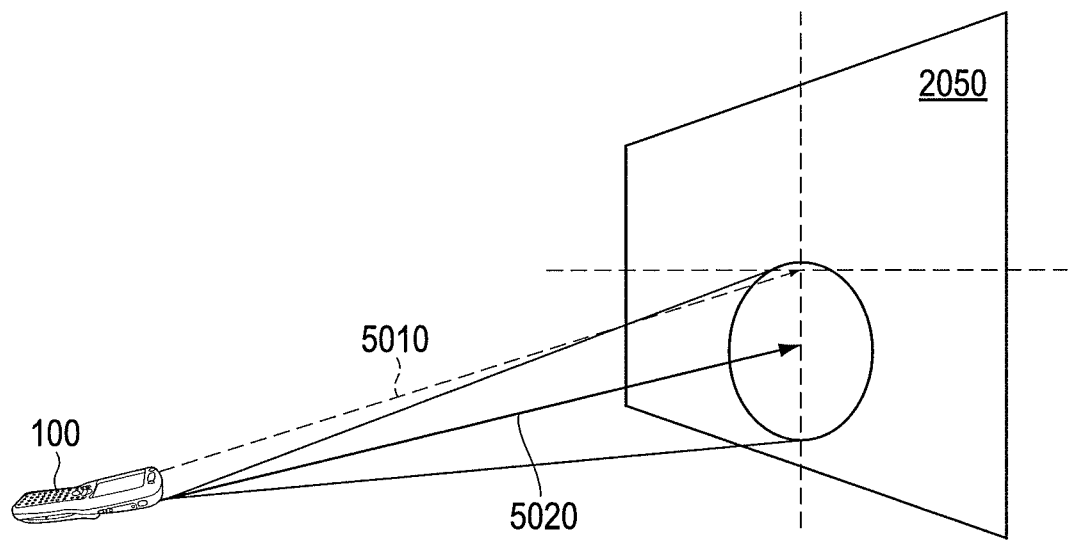
FIGS. 5a-5b schematically illustrate determining a spatial position of the RF signal coverage shape based on the known position and orientation of an RF antenna relatively to the position of the field of view of a two-dimensional imager.
Figure 5B:
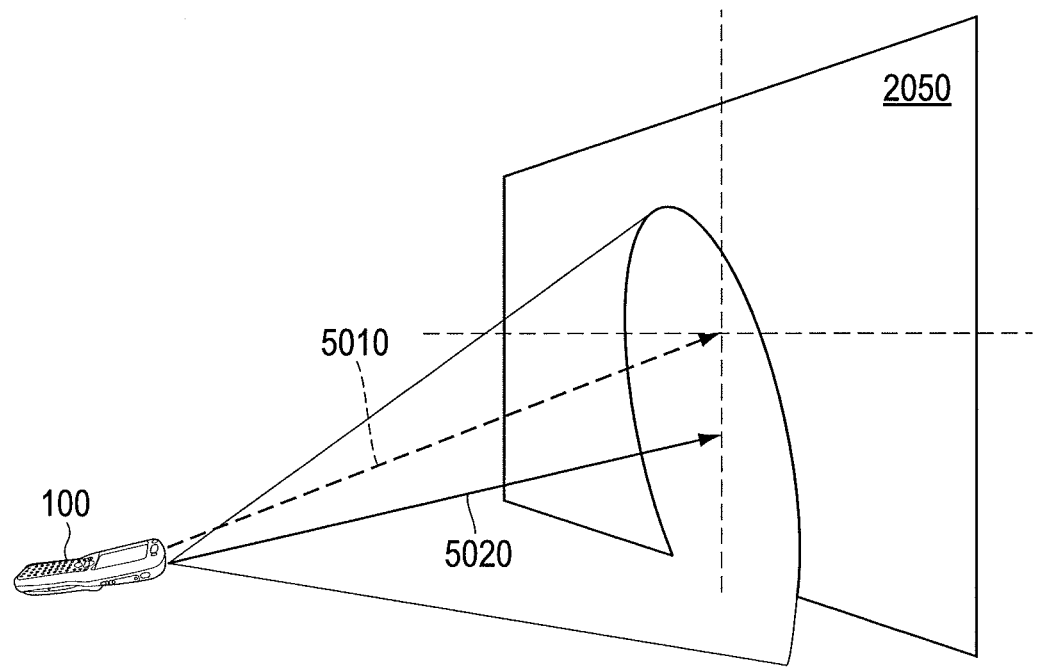

As noted herein supra, the RFID reading terminal described herein can be configured to determine a spatial position of the RF signal coverage shape based on the known position and orientation of the RF antenna relatively to the position of the field of view (FOV) of the imaging device, as schematically shown in FIGS. 5a-5b.

The plane 2050 can represent an arbitrary chosen plane, e.g., a plane intersecting a physical structure hosting one or more inventory items. The RF antenna can be oriented relatively to the view finder in such a way that the central axis 5010 of the field of view of the imager would be parallel to the central axis 5020 of the RF signal coverage shape by the antenna. Reducing the distance between the RFID reading terminal and the plane 2050 and/or increasing the RF transmit power level results in a larger intersection of the RF signal coverage area and the plane 5020, as schematically shown in FIGS. 5a-5b. In the example of FIG. 5b, the lesser distance and/or the greater transmit power level results in a larger intersection of the RF signal coverage area and the plane 5020. The intersection of the RF signal coverage shape and the plane 2050 can be entirely within the FOV of the two-dimensional imager, as schematically shown in FIG. 5a, or can be partially outside of the FOV of the two-dimensional imager, as schematically shown in FIG. 5b.

The position of the field of view can, in turn, be correlated to the surface of the physical structure over which the scan trace is overlaid, based on identifying one or more pre-defined objects within a sequence of images of the physical structure taken by a moving RFID reading terminal.

In some embodiments, the visual cues can be based on intrinsic features of the physical structure, such as edges, surface lines, and/or two-dimensional objects on the surface of the physical structure. The visual cues can also include custom two-dimensional objects mounted on the surface of the physical structure. In some embodiments at least one visual cue can be provided by a label containing decodable indicia (e.g., one or more bar codes).

Figure 6:
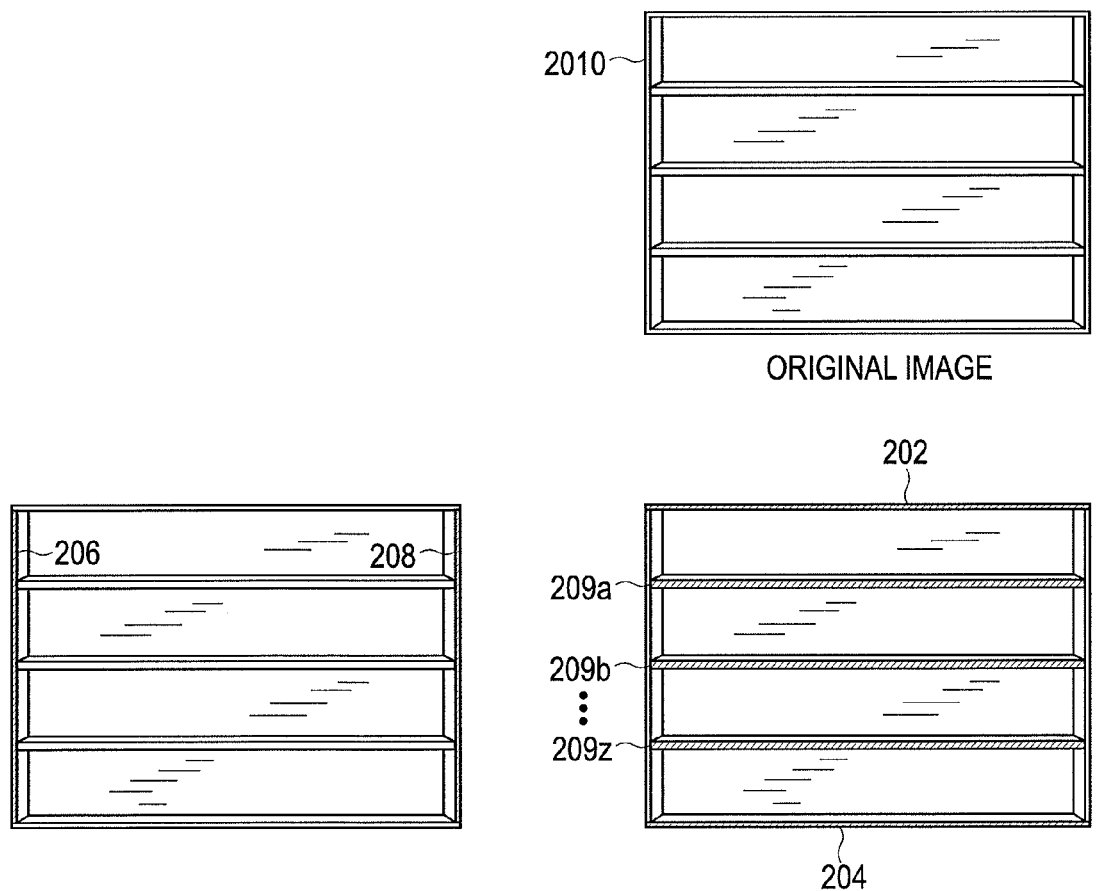
FIG. 6 schematically illustrate detecting a plurality of edges corresponding to the boundaries and structural elements of the imaged object.

The RFID reading terminal described herein can employ various image processing algorithms to identify the objects contained within one or more image acquired by the imaging device. The RFID reading terminal can be configured to process an acquired image to detect the edges corresponding to the boundaries of the imaged object 2010, as schematically shown in FIG. 6. An "edge" in this context shall refer to a line along which one or more image characteristics (such as hue, saturation, color value, and brightness), both individually or in combinations, change sharply, e.g., by at least a pre-defined number of units of measuring the respective image characteristic. For example, an edge can be defined as a line along which the image brightness changes by at least a pre-defined number of brightness units. In another example, an edge can be defined as a line along which the image color changes by at least a pre-defined number of color value units. By applying an edge detecting algorithm to an image, boundaries of objects and/or boundaries of parts of objects can be discovered.

In the illustrative embodiment of FIG. 6, the top 202, bottom 204, left 206 and right 208 boundaries of the front surface of the imaged physical structure can be detected. In another illustrative embodiment, the RFID reading terminal can be further configured to process the acquired image to detect the edges corresponding to the structural elements of the imaged object, e.g., to the shelves 209a-209z of the shelving unit.

In one embodiment, the RFID reading terminal can be configured to detect edges by computing a plurality of derivatives of image pixels brightness, followed by searching for local maxima of the first order derivatives of image pixel brightness (e.g., by searching for zero crossings by the second-level derivatives). Image pixels corresponding to the local maxima of the first order derivatives of pixel brightness can be presumed to indicate the edges within the image. A skilled artisan would appreciate the fact that other methods of edge detection is within the scope of this disclosure.

Figure 7A:
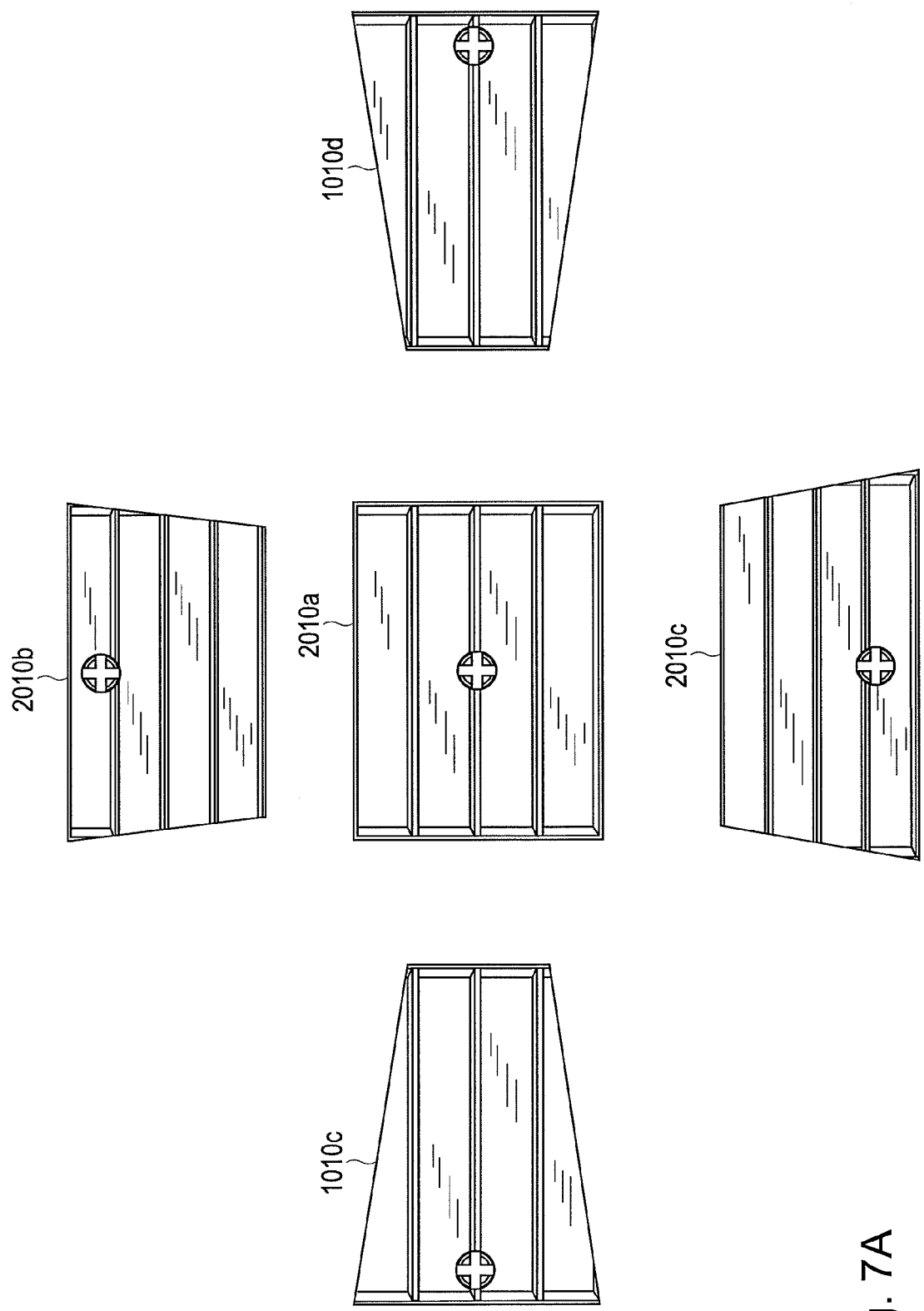
FIGS. 7a-7b schematically illustrates keystone- and rotation-related image distortions.

In a further aspect, the EIR terminal can be configured to process the acquired image to correct any keystone-, and/or rotation-related image distortions. Keystone-related distortions, often nicknamed "keystone effect" can be caused by the optical axis of the imaging device not being substantially perpendicular to the center of the surface of the imaged object, resulting in the image of a rectangle on the surface of the imaged object becoming a trapezoid (which is the shape of an architectural keystone, which explains the name of the effect). FIG. 7a illustrates several images of a shelving unit 2010, where the image 2010a is free of keystone effect, and images 2010b, 2010c, 2010d, and 2010e contain visible keystone distortions.

Figure 7B:
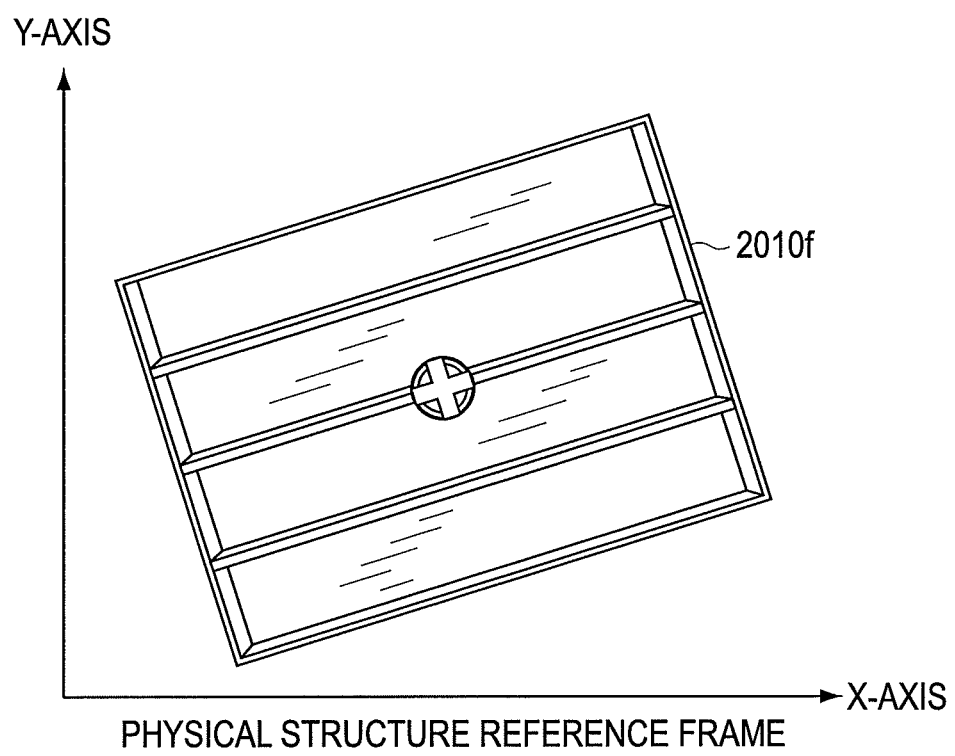

Rotation-related image distortions are deviations of horizontal (and/or vertical) lines within the imaged object from the respective horizontal and vertical axes in the image frame. In some situations, the imager during the exposure period can be rotated with respect to the frame of reference of the physical object 2010f, as schematically illustrated by FIG. 7b.

In an illustrative use case, an operator can point the RFID reading terminal to a bar code label attached to the surface of a physical structure containing a plurality of items to be inventoried, and issue a user interface command (e.g., by pressing Scan button). Responsive to receiving the user interface command, the RFID reading terminal can acquire an image using its two-dimensional imaging device and attempt to locate decodable indicia (e.g., one or more bar codes) within the acquired image. The decodable indicia can be decoded into a message comprising an identifier of one or more data items residing in a local or remote memory. The data items can contain an image and/or a description of the physical structure. In one illustrative embodiment, the data items can be stored in one or more indexed tables.

Upon successfully decoding the decodable indicia, the RFID reading terminal can retrieve from the memory an image and/or a description of the physical structure. In some embodiments, the memory storing the image and/or description of the physical structure can be provided by a local nonvolatile memory (e.g., ROM or flash memory). Alternatively, the memory can reside on an external computer accessible by the RFID reading terminal over a network.

Figure 8:
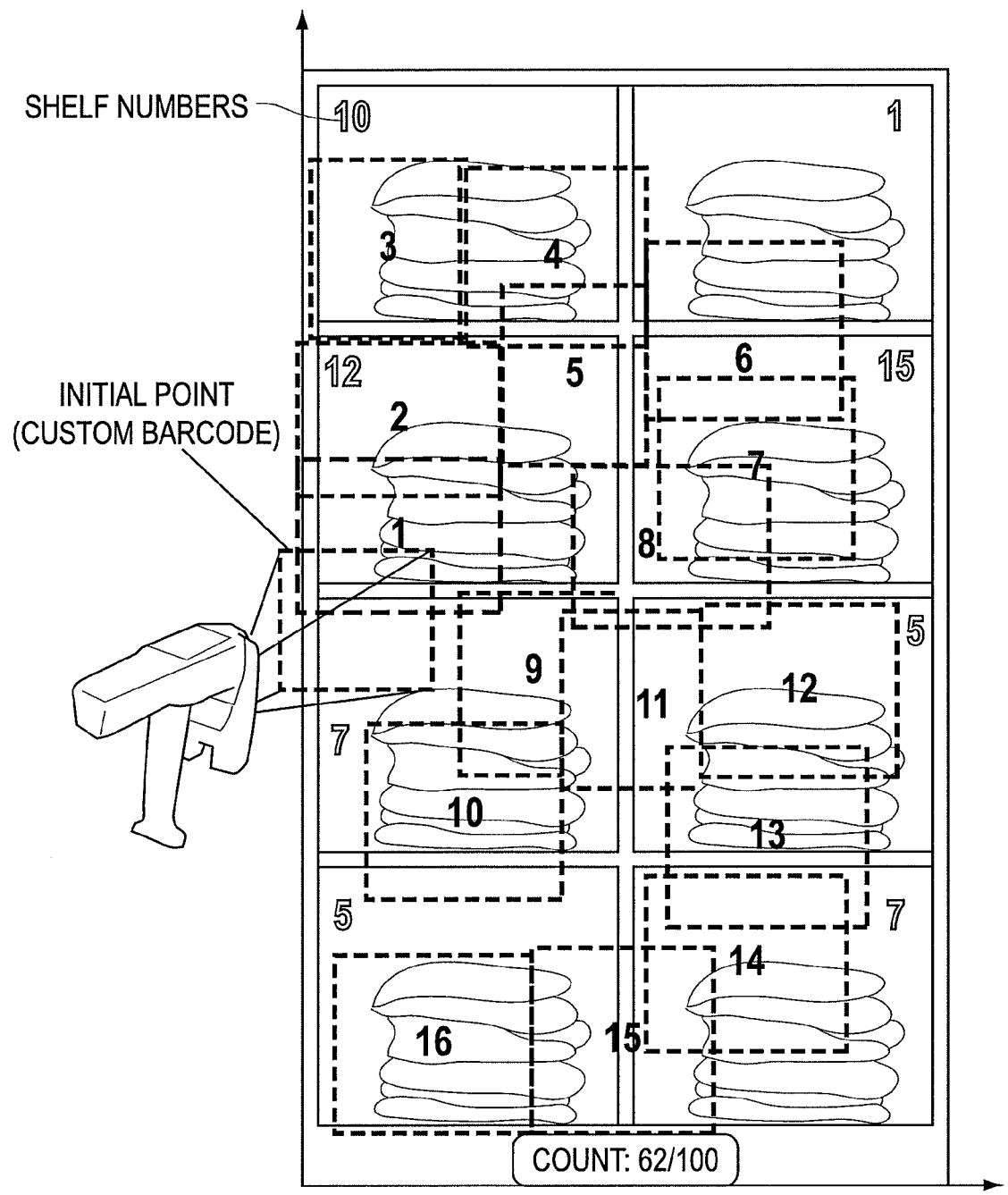
FIGS. 8-9 schematically illustrate determining spatial position and orientation of an RFID reading terminal based on identifying pre-determining objects (visual cue) within a series of images acquired by a two-dimensional imager.

In one illustrative embodiment, the description of the physical structure can comprise the type of the physical structure (e.g., a shelving unit), configuration (e.g., number of shelves), and/or physical dimensions of the physical structure and its elements. The description of the physical structure can further comprise the locations of one or more visual cues (e.g., decodable indicia labels) on the surface of the physical structure. Location of a visual cue can be specified in units of length as measured along the surface of the physical structure relative to a pre-defined point-of-origin situated on the surface of the physical structure (e.g., the bottom left corner). Alternatively, location of a visual cue can be specified by referring to one or more enumerated elements of the physical structure (e.g., shelf number two), as schematically shown in FIG. 8.

Upon scanning the decodable indicia attached to the physical structure, the operator of the RFID reading terminal can scan RFID tags attached to the inventory items sustained by the physical structure by moving the RFID reading terminal to follow an imaginary trajectory within the physical structure. While being moved along the imaginary trajectory, the RFID reading terminal can acquire a sequence of images 1-16 using the two-dimensional imaging device, as schematically shown in FIG. 8. In some embodiments, the images can be acquired at pre-defined time intervals. Alternatively, the images can be acquired at the time intervals that can be adaptively adjustable, e.g., based on the rate of the movement which can be measured as described herein infra. In the latter case, the time interval between acquiring two subsequent images can be decreased with the terminal movement rate increasing.

Figure 9:
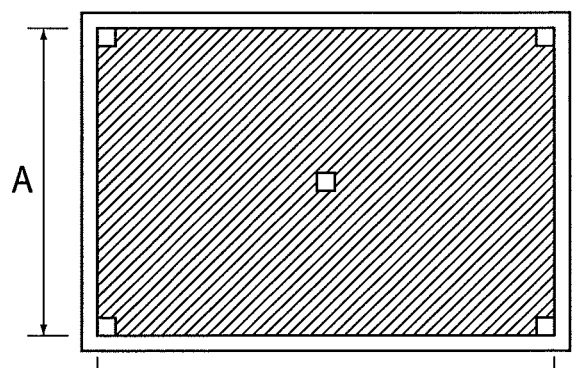
Figure 9:
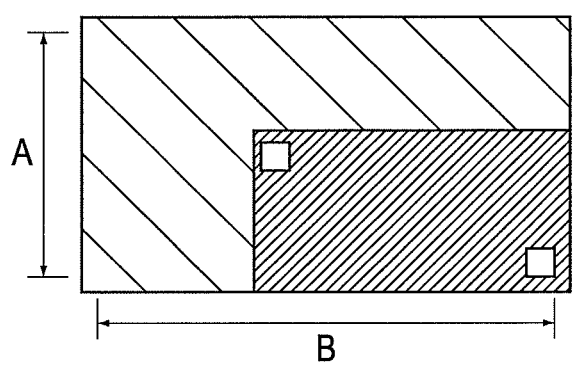
Figure 9:
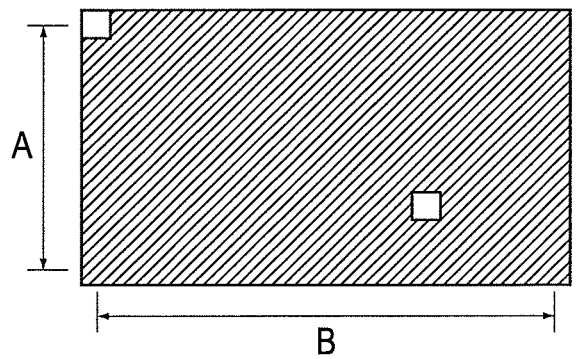

Each image can at least partially comprise the physical structure sustaining the inventory items being scanned. Within each image of the acquired sequence of images 1-16 schematically shown in FIG. 8, the RFID reading terminal can locate one or more pre-defined objects (visual cues). Based on the relative positions of one or more identified objects within two or more images and known distances between the objects measured along the surface of the physical structure, the RFID reading terminal can determine the orientation of the view finder of the two-dimensional imaging device relative to the physical structure, as well as direction and rate of movement of the RFID reading terminal, as schematically illustrated by FIG. 9.

In some embodiments, the time interval between two consecutive images can be pre-defined so that any two consecutive images would have the fields of view overlapping by at least a pre-defined angle provided that the movement rate of the RFID terminal falls within a pre-defined interval of working movement rates. Alternatively, the pre-defined time interval between two consecutive images can be dynamically adjusted by decreasing the time interval responsive to detecting the fields of view of two consecutive images overlapping by less than a first pre-defined angle and/or increasing the time interval responsive to detecting the fields of view of two consecutive images overlapping by more than a second pre-defined angle.

While no overlap between two consecutive images can under some circumstances lead to possible loss of tracking of the current position, the RFID reading terminal can be configured to attempt to re-calculate its current position and/or orientation by attempting to locate and identify one or more objects (visual cues) within the last acquired image. In some embodiments, the RFID reading terminal can be further configured to prompt the operator to re-scan the decodable indicia label containing the identifier of the fixture responsive to failing to determine the current position and/or orientation of the RFID reading terminal based on one or more acquired images.

As noted herein supra, the RF signal coverage of an RFID reading terminal can be defined by a 3D shape, and can be visualized as an intersection of the 3D signal coverage shape and an arbitrarily chosen plane (e.g., the surface of the physical structure sustaining the inventory items). Thus, the shape and the dimensions of the RF signal visual scan trace depend upon the distance between the arbitrary chosen plane and the transmitting RF antenna of the RFID reading terminal. For example, reducing the distance between the RFID reading terminal and the plane 2050 and/or increasing the RF transmit power level results in a larger intersection of the RF signal coverage area and the plane 5020, as schematically shown in FIGS. 5a-5b. In the example of FIG. 5b, the lesser distance and/or the greater transmit power level results in a larger intersection of the RF signal coverage area and the plane 5020.

The distance between the surface of the physical structure sustaining the inventory items and the RFID reading terminal can be calculated based on the known distance between two objects (visual cues) images of which are present in an image acquired by the two-dimensional imaging device, using the following formula:

$$D = d*S_2/S_1,$$

wherein D is the distance between the RFID reading terminal and the surface of the physical structure onto which the RFID signal coverage shape is projected;

d is a constant coefficient depending upon the distance between the focal center of the imaging lens and the image sensor surface;

$S_2$ is the distance between two visual cues on the surface of the physical structure; and $S_1$ is the distance between the images of the two visual cues within the image acquired by the two-dimensional imaging device.

Based on the known shape of the signal coverage and the distance and orientation of the RF antenna to a physical structure 115 containing the inventory items, the RFID reading terminal can determine and display the intersection of the 3D RF signal coverage shape and the plane defined by surface of the physical structure 115 as schematically shown in FIG. 1.

Figure 10A:
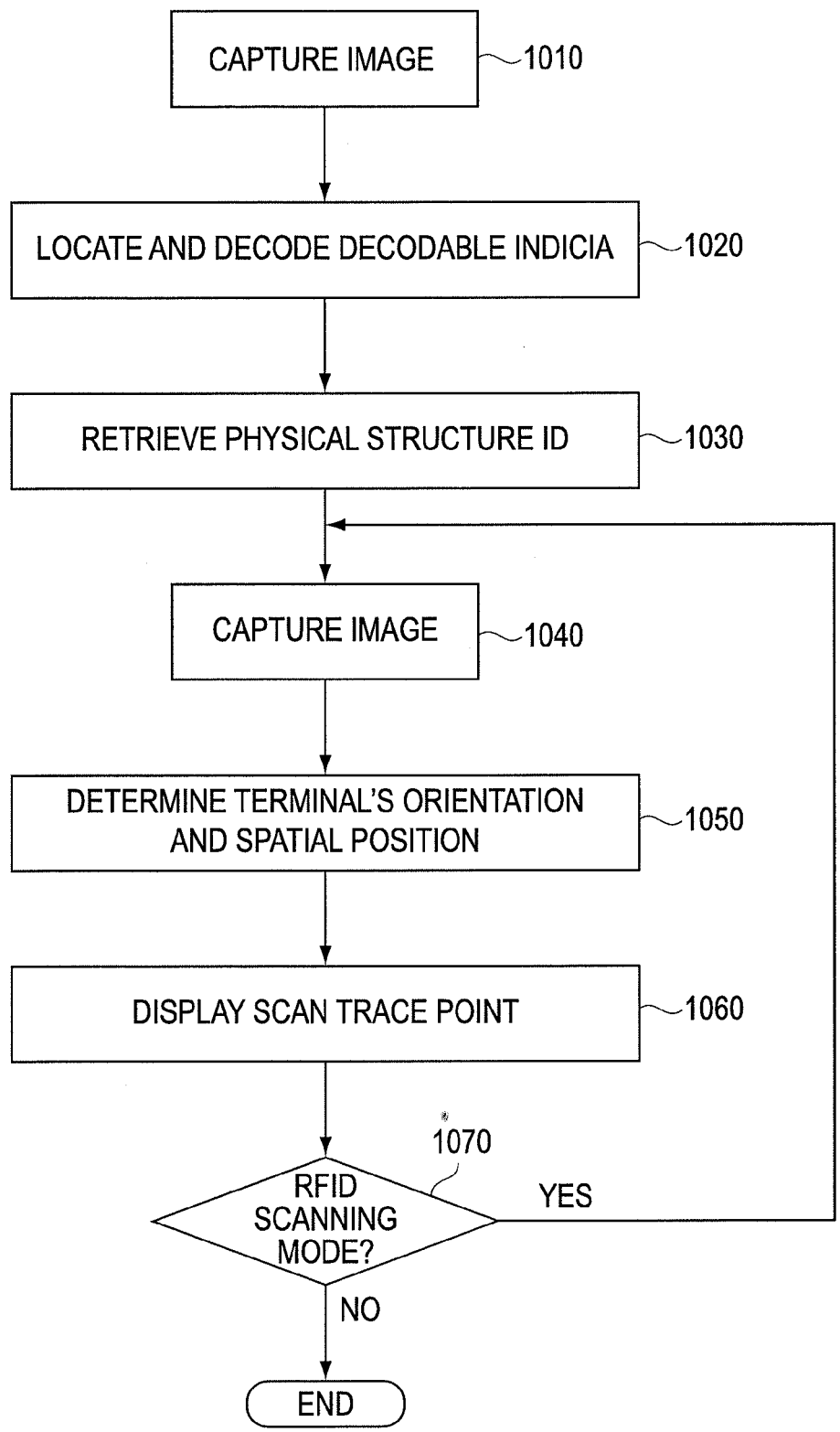
FIG. 10a-10b schematically illustrate block diagrams of various illustrative embodiments of methods of displaying a visual scan trace by the portable RFID reading terminal described herein.

FIG. 10a schematically illustrates a block diagram of one illustrative embodiment of a method of displaying a visual scan trace by a portable RFID reading terminal.

The processing begins at step 1010 by the RFID reading terminal's, responsive to a user interface command (e.g., Scan button), acquiring an image of a decodable indicia label attached to the surface of a physical structure containing a plurality of items to be inventoried.

At step 1020, RFID reading terminal can locate and decode the decodable indicia (e.g., one or more bar codes). The decodable indicia can be decoded into a message comprising an identifier of one or more data items residing in a local or remote memory. The data items can contain an image and/or a description of the physical structure. In one illustrative embodiment, the data items can be stored in one or more indexed tables. In some embodiments, the message produced by decoding the decodable indicia can further contain one or more symbols indicating start of RFID scanning mode. Alternatively, the RFID scanning mode can be initiated by a user interface action (e.g., by pressing the Scan button).

At step 1030, the RFID reading terminal can retrieve from the memory an image and/or a description of the physical structure. In some embodiments, the memory storing the image and/or description of the physical structure can be provided by a local nonvolatile memory (e.g., ROM or flash memory). Alternatively, the memory can reside on an external computer accessible by the RFID reading terminal over a network.

Upon scanning the decodable indicia attached to the physical structure, the operator of the RFID reading terminal can scan RFID tags attached to the inventory items sustained by the physical structure by moving the RFID reading terminal to follow an imaginary trajectory within the physical structure.

At step 1040, the RFID reading terminal can acquire an image at least partially comprising the physical structure sustaining the inventory items being scanned.

At step 1050, the RFID reading terminal can locate one or more pre-defined objects (visual cues) within the acquired image. Based on the relative positions of one or more identified objects within two or more images and known distances between the objects measured along the surface of the physical structure, the RFID reading terminal can determine the orientation of the view finder of the two-dimensional imaging device relative to the physical structure, as well as direction and rate of movement of the RFID reading terminal, as schematically illustrated by FIG. 9.

At step 1060, the RFID reading terminal can display a scan trace point overlaid over an image of the physical structure.

At step 1070, responsive to ascertaining that the RFID scanning mode continues (e.g., Scan button being depressed), the method can loop back to step 1040; otherwise, the processing can terminate.

Figure 10B:
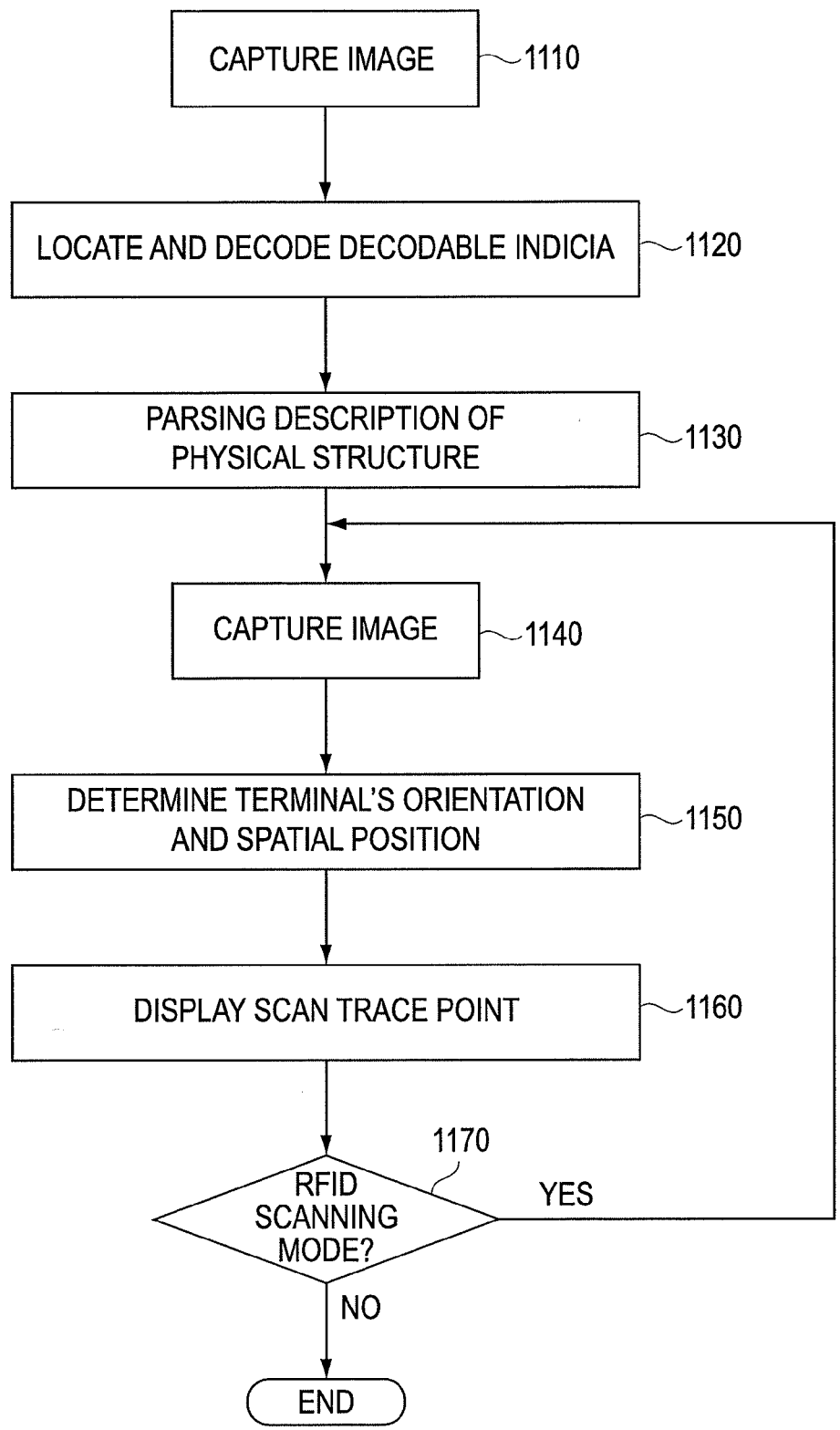

FIG. 10b schematically illustrates a block diagram of one illustrative embodiment of a method of displaying a visual scan trace by a portable RFID reading terminal.

The processing begins at step 1110 by the RFID reading terminal's, responsive to a user interface command (e.g., Scan button), acquiring an image of a decodable indicia label attached to the surface of a physical structure containing a plurality of items to be inventoried.

At step 1120, RFID reading terminal can locate and decode the decodable indicia (e.g., one or more bar codes). The decodable indicia can be decoded into a message comprising an image and/or a description of the physical structure. In some embodiments, the message produced by decoding the decodable indicia can further contain one or more symbols indicating start of RFID scanning mode. Alternatively, the RFID scanning mode can be initiated by a user interface action (e.g., by pressing the Scan button).

At step 1130, the RFID reading terminal can parse the description of the physical structure and produce one or more data elements containing descriptions of the physical structure elements (e.g., shelves).

Upon scanning the decodable indicia attached to the physical structure, the operator of the RFID reading terminal can scan RFID tags attached to the inventory items sustained by the physical structure by moving the RFID reading terminal to follow an imaginary trajectory within the physical structure.

At step 1140, the RFID reading terminal can acquire an image at least partially comprising the physical structure sustaining the inventory items being scanned.

At step 1150, the RFID reading terminal can locate one or more pre-defined objects (visual cues) within the acquired image. Based on the relative positions of one or more identified objects within two or more images and known distances between the objects measured along the surface of the physical structure, the RFID reading terminal can determine the orientation of the view finder of the two-dimensional imaging device relative to the physical structure, as well as direction and rate of movement of the RFID reading terminal, as schematically illustrated by FIG. 9.

At step 1160, the RFID reading terminal can display a scan trace point overlaid over an image of the physical structure.

At step 1170, responsive to ascertaining that the RFID scanning mode continues (e.g., Scan button being depressed), the method can loop back to step 1140; otherwise, the processing can terminate.

In a further aspect, the RFID reading terminal can be further configured to display a quantity of scanned items, a quantity of items which have not been scanned yet, and/or a total quantity of items to be scanned, the latter quantity determined based on an inventory count or list of items describing a storage, manufacturing, and/or retail facility. A progress indicator 191 of FIG. 1 shows the number of items scanned and the total number of items expected to be scanned.

Figure 11:
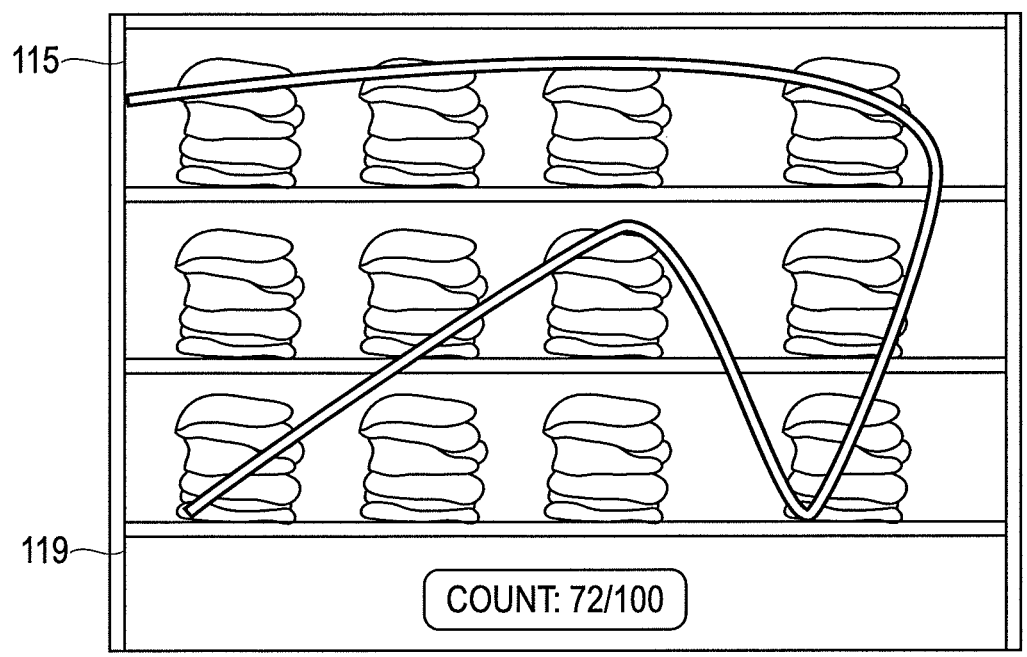
FIGS. 11-12 schematically illustrate various methods of displaying scan traces and selected inventory quantities by the RFID reading terminal.
Figure 12:
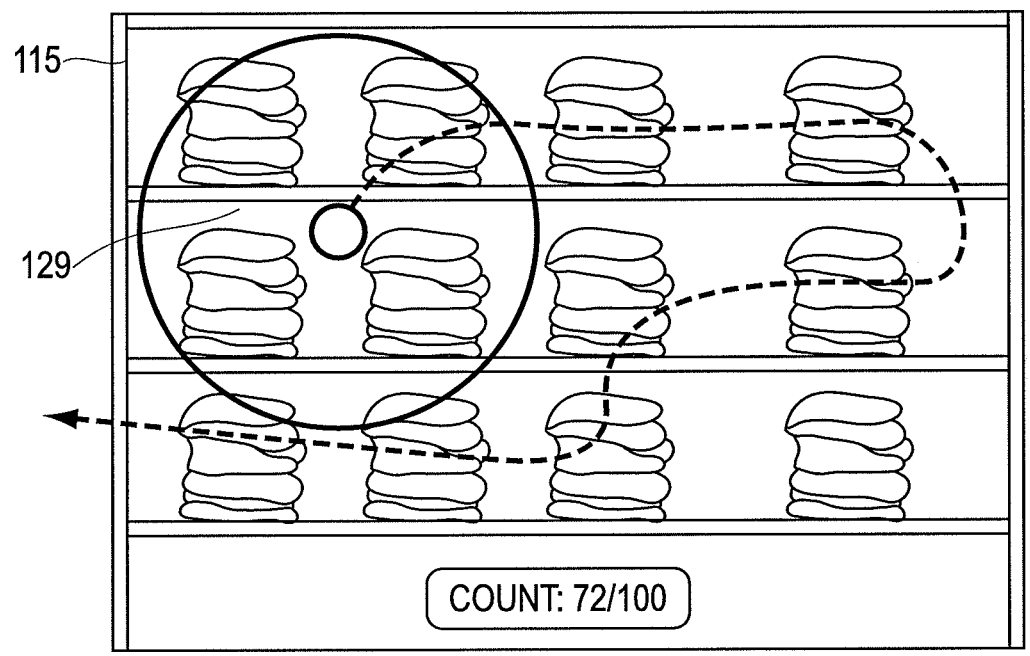

In one embodiment, the RFID reading terminal 100 can be further configured to display an indicator 119 of the RF signal coverage over a scan trace, as schematically shown in FIG. 11. The indicator of the RF signal coverage can be determined as a line being an intersection of the 3D RF signal coverage shape and a plane defined by the surface of the physical structure 115 containing the inventory items. In another embodiment, the RFID reading terminal 100 can be further configured to display an indicator 129 of the RF signal coverage over a current position aimed at by the RFID reading terminal, as schematically shown in FIG. 12.

In one embodiment, the RFID reading terminal can be further configured to display a scan trace overlaid over an image of a physical structure (e.g., a shelf) containing one or more scanned items and one or more items to be scanned. In one embodiment, the image of the physical structure containing the inventory items can be received by the RFID reading terminal over the network from an external computer. In another embodiment, the image of the physical structure containing the inventory items can be acquired by the imaging device. In another embodiment, the image of the physical structure is drawn, with appropriate detail, on the RFID reading terminal display, based on a description of the physical structure received by the terminal via the user interface, from an external peripheral device or from an external computer.

In a further aspect, RFID reading device 333 can be compliant with EPC™ Class-1 Generation-2 UHF RFID Protocol for Communications at 860 MHz-960 MHz by EPCglobal, commonly known as the "Gen 2" standard, which defines physical and logical requirements for a passive-backscatter, interrogator-talks-first (ITF) RFID system operating in the 860 MHz-960 MHz frequency range.

In one embodiment, an RFID reading terminal described herein can transmit information to a passive RFID tag by modulating an RF signal in the 860-960 MHz frequency range. An RFID tag can receive both information and operating energy from the RF signal transmitted by the RFID reading terminal. The RFID reading terminal can receive information from the RFID tag by transmitting a continuous-wave (CW) RF signal to the RFID tag. "Continuous wave" can refer to any waveform transmitted by an RFID reading device and suitable to power a passive RFID tag, e.g., a sinusoid at a given frequency. The RFID tag can respond by modulating the reflection coefficient of its antenna, thus backscattering an information signal to the RFID reading terminal. In one embodiment, the RFID tag can modulate the reflection coefficient of its antenna only responsive to receiving an RFID signal from the RFID reading terminal.

In a further aspect, the RFID reading terminal described herein can be configured to send information to one or more RFID tags by modulating an RF carrier using double-sideband amplitude shift keying (DSB-ASK), single-sideband amplitude shift keying (DSB-ASK), or phase-reversal amplitude shift-keying (PR-ASK) using a pulse-interval encoding (PIE) format. RFID tags can receive their operating energy from the same modulated RF carrier.

The RFID reading terminal described herein can be configured to receive information from an RFID tag by transmitting an unmodulated RF carrier and listening for a backscatter reply. RFID tags can transmit information by backscatter-modulating the amplitude and/or phase of the RFID carrier. RFID tags can encode the backscattered data using, e.g., FM0 baseband or Miller modulation of a subcarrier at the data rate. The encoding method to be employed by an RFID tag can be selected by the RFID reading terminal.

In another aspect, the RFID reading terminal described herein can establish one or more sessions with one or more RFID tags. An RFID tag can support at least one session-dependent flag for every session. The session-dependent flag can have two states. An RFID tag can invert a session-dependent flag responsive to receiving a command from RFID reading terminal 100. Tag resources other than session-dependent flags can be shared among sessions. In another aspect, an RFID tag can support a selected status flag indicating that the tag was selected by the RFID reading terminal.

Responsive to receiving an interrogation signal transmitted by an RFID reading terminal, an RFID tag can transmit a response signal back to RFID reading terminal. The response signal can contain useful data, e.g., an Electronic Product Code (EPC) identifier, or a tag identifier (TID). The response signal can include a representation of a binary string, at least part of which is equal to at least part one of the specified one or more target item identifiers.

In one embodiment, RFID reading terminal can implement EPC™ Class-1 Generation-2 UHF RFID Protocol for Communications at 860 MHz-960 MHz by EPCglobal. The RFID reading terminal described herein can interrogate RFID tags using the commands described herein infra.

Select command can be used by the RFID reading terminal to select a particular RFID tag population for the subsequent inventory round. Select command can be applied successively to select a particular tag population based on user-specified criteria. Select command can include the following parameters:

Target parameter indicates whether Select command modifies a tag's SL flag or Inventoried flag, and in the latter case it further specifies one of four available sessions (S0, . . . , S3);

Action parameter indicates whether matching tags assert or deassert SL flag, or set their Inventoried flag to A or B state; tags conforming to the contents of MemBank, Pointer, Length, and Mask parameters are considered to be matching;

Mask parameter contains a bit string that a tag should compare to a memory location specified by MemBank, Pointer, and Length parameters;

MemBank parameter specifies the memory bank to which Mask parameter refers (EPC, TID, or User);

Pointer parameter specifies a memory start location for Mask;

Length parameter specifies the number of bits of memory for Mask; if Length is equal to zero, all tags are considered matching.

Inventory command set can be used by the RFID reading terminal to single out one or more individual tags from a group. A tag can maintain up to four simultaneous sessions and a binary Inventoried flag for each session. Inventory command set includes the following commands:

Query command can be used to initiate and specify an inventory round; it contains a slot counter value (Q=0 to 15) determining the number of slots in the round; the command also includes Sel parameter specifying which tags should respond to the Query.

QueryAdjust command can be used to adjust the value of the tag's slot counter Q without changing any other parameters;

QueryRep command can be used to repeat the last Query command;

Ack command can be used to acknowledge a tag's response;

NAK command can be used to force a tag to change its state to Arbitrate.

An RFID tag can implement a state machine. Once energized, a tag can change its current state to Ready. A selected tag can, responsive to receiving Query command, select a random integer from the range of $[0; 2^{Q-1}]$. If the value of zero is selected, the tag can transition to Reply state, backscattering a 16-bit random number. If a non-zero value is selected, the tag can load the selected random integer into its slot counter and change its state to Arbitrate.

Responsive to receiving the tag transmission, RFID reading terminal can acknowledge it with Ack command containing the same random number. Responsive to receiving Ack command, the tag can change its state to Acknowledged and backscatter its protocol control (PC) bits, EPC and cyclic redundancy check (CRC) value. Unacknowledged tag can select a new random integer from the range of $[0; 2^{Q-1}]$, load the value into its slot counter, and change its state to Arbitrate. Responsive to receiving QueryAdjust command, a tag in the Arbitrate state should decrement the value of its slot counter and backscatter its protocol control (PC) bits, EPC and CRC value if its slot counter is equal to zero.

Responsive to receiving the tag's transmission of its PC, EPC and 16-bit CRC value, RFID reading terminal can send a QueryAdjust command causing the tag to invert its Inventoried flag and to transition to Ready state.

Access command set can be used by the RFID reading terminal for communicating with (reading from and writing to) a tag. An individual tag must be uniquely identified prior to access. Access command set includes the following commands:

ReqRn command can be used by the RFID reading terminal to request a handle from a tag; the handle can be used in the subsequent Access command set commands. Responsive to receiving Req_RN commands, a tag returns a 16-bit random integer (handle) and transitions from Acknowledged to Open or Secured state.

Read command can be used by the RFID reading terminal to read tag's Reserved, EPC, TID and User memory;

Write command can be used by the RFID reading terminal to write to tag's Reserved, EPC, TID and User memory;

Kill command can be used by the RFID reading terminal to permanently disable a tag;

Lock command can be used by the RFID reading terminal to lock passwords preventing subsequent read or write operations; lock individual memory banks preventing subsequent write operations; permanently lock the lock status of passwords or memory banks;

Access command can be used by the RFID reading terminal to cause a tag having a non-zero access password to transition from Open to Secured state.

A skilled artisan would appreciate the fact that other methods of interrogating RFID tags by an RFID reading terminal are within the scope of this disclosure.

Figure 13A:
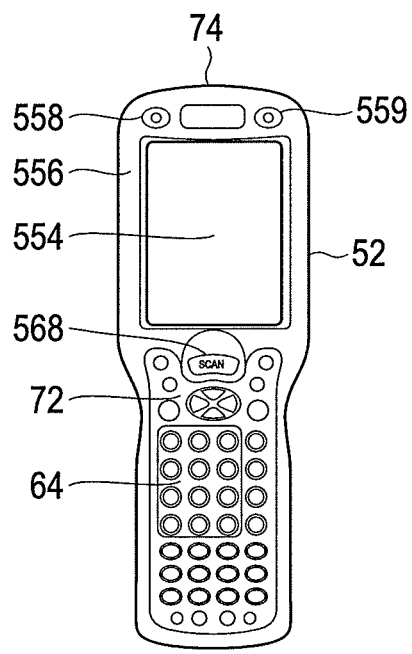
FIGS. 13a-13c schematically illustrate embodiments of an RFID reading terminal.
Figure 13B:
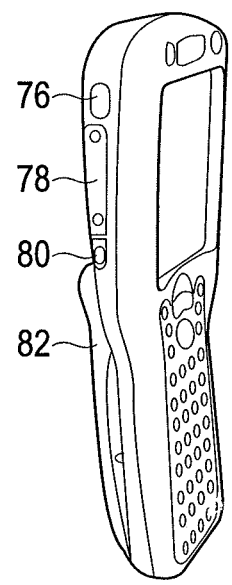
Figure 13C:
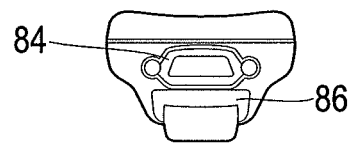

One embodiment of the RFID reading terminal 100 is schematically shown in FIGS. 13a (front panel view), 13b (side panel view), and 13c (bottom panel view). The RFID reading terminal 100 can comprise a housing 52 within which other components of the RFID reading terminal 100 can be disposed. An LCD screen display with a touch screen sensor 554 can be disposed on the front panel 556. Also disposed on the front panel 556 can be a decode LED 558, a scan LED 559, and a keyboard 64 including a scan key 568 and navigation keys 72. An imaging window 74 can be disposed on the top panel of housing 52. Disposed on the side panel (best viewed in FIG. 13b) can be an infra-red communication port 76, an access door to a secure digital (SD) memory interface 78, an audio jack 80, and a hand strap 82. Disposed on the bottom panel (best viewed in FIG. 13c) can be a multi-pin mechanical connector 84 and a hand strap clip 86. RFID reading device (not shown in FIGS. 13a-13c) can be disposed within the housing 52.

A small sample of illustrative devices, systems, apparata, and methods that are described herein is as follows:

A1. A portable RFID reading terminal comprising: a processor; a memory communicatively coupled to said processor; an RFID reading device; a two-dimensional imaging device; a display; wherein said portable RFID reading terminal is configured, responsive to receiving a user interface action, to capture an image of at least one part of a physical structure using said imaging device; wherein said portable RFID reading terminal is further configured, responsive to locating optical decodable indicia within said image, to decode said optical decodable indicia into a message comprising an identifier of said physical structure; wherein said portable RFID reading terminal is further configured to retrieve from a database, using said identifier of said physical structure, at least one of: a reference image of said physical structure and a description of said physical structure; wherein said portable RFID reading terminal is further configured, while being moved to follow an imaginary trajectory within said physical structure, to repetitively perform the following steps: (i) capturing an image of said physical structure using said imaging device; (ii) responsive to identifying one or more objects within each captured image, determining an orientation and a current spatial position of said RFID reading terminal relative to said physical structure; (iii) displaying on said display an RFID scan trace point defined by an intersection of a coverage shape of an RF signal transmitted by said RFID reading device and a chosen plane intersecting said physical structure; and wherein said RFID scan trace is defined by a line comprising a plurality of time varying RFID scan trace points. A2. The portable RFID reading terminal of (A1), wherein said decodable indicia is provided by a bar code. A3. The portable RFID reading terminal of (A1), wherein said message further comprises a description of said physical structure. A4. The portable RFID reading terminal of (A1), further configured, responsive to retrieving said description of said physical structure from said database, to determine and store in said memory own spatial position as a point of origin. A5. The portable RFID reading terminal of (A1), further configured, responsive to retrieving said reference image of said physical structure from said database, to display said image on said display. A6. The portable RFID reading terminal of (A1), further configured to identify said one or more objects within each captured image based on comparing said captured image to at least one of: said reference image of said physical structure and said description of said physical structure. A7. The portable RFID reading terminal of (A1), further configured to determine said orientation and said current spatial position of said RFID reading terminal relative to said physical structure based on comparing two or more subsequently captured images of said physical structure. A8. The portable RFID reading terminal of (A1), further configured to determine said orientation and said current spatial position of said RFID reading terminal relative to said physical structure based on estimated distance to said physical structure. A9. The portable RFID reading terminal of (A1), wherein said one or more objects are provided by one more of: an edge of said physical structure and a two-dimensional object on a surface of said physical structure. A10. The portable RFID reading terminal of (A1), wherein said database is provided by one of: a local database, a remote database residing on an external computer. A11. The portable RFID reading terminal of (A1), further configured to display said RFID scan trace overlaid over an image of said physical structure.

B1. Method of displaying a visual RFID scan trace by a portable RFID reading terminal including a processor, a memory, an RFID reading device, a two-dimensional imaging device, and a display, said method comprising the steps of: orienting said portable RFID reading terminal so that at least one part of a physical structure sustaining a plurality of inventory items appears in a field of view of said imaging device; said portable RFID reading terminal, responsive to receiving a user interface action, capturing an image of at least one part of a physical structure using said imaging device; said portable RFID reading terminal, responsive to locating optical decodable indicia within said image, decoding said optical decodable indicia into a message comprising an identifier of said physical structure; said portable RFID reading terminal retrieving from a database, using said identifier of said physical structure, at least one of: a reference image of said physical structure and a description of said physical structure; said portable RFID reading terminal, while being to follow an imaginary trajectory within said physical structure, repetitively performing the following steps: capturing an image of said physical structure using said imaging device; responsive to identifying one or more objects within each captured image, determining an orientation and a current spatial position of said RFID reading terminal relative to said physical structure; displaying on said display a scan trace point defined by an intersection of a coverage shape of an RF signal transmitted by said RFID reading device and a chosen plane intersecting said physical structure; wherein said RFID scan trace is defined by a line comprising a plurality of time varying scan trace points. B2. The method of (B1), wherein said decodable indicia is provided by a bar code. B3. The method of (B1), wherein said one or more objects are provided by one more of: an edge of said physical structure and a two-dimensional object on a surface of said physical structure. B4. The method of (B1), wherein said database is provided by one of: a local database, a remote database residing on an external computer.

C1. Method of displaying a visual RFID scan trace by a portable RFID reading terminal including a processor, a memory, an RFID reading device, a two-dimensional imaging device, and a display, said method comprising the steps of: orienting said portable RFID reading terminal so that at least one part of a physical structure sustaining a plurality of inventory items appears in a field of view of said imaging device; said portable RFID reading terminal, responsive to receiving a user interface action, capturing an image of at least one part of a physical structure using said imaging device; said portable RFID reading terminal, responsive to locating optical decodable indicia within said image, decoding said optical decodable indicia into a message comprising a description of said physical structure; said portable RFID reading terminal, while being to follow an imaginary trajectory within said physical structure, repetitively performing the following steps: (i) capturing an image of said physical structure using said imaging device; (ii) responsive to identifying one or more objects within each captured image, determining an orientation and a current spatial position of said RFID reading terminal relative to said physical structure; (iii) displaying on said display a scan trace point defined by an intersection of a coverage shape of an RF signal transmitted by said RFID reading device and a chosen plane intersecting said physical structure; wherein said RFID scan trace is defined by a line comprising a plurality of time varying scan trace points. C2. The method of (C1), wherein said decodable indicia is provided by a bar code. C3. The method of (C1), wherein said one or more objects are provided by one more of: an edge of said physical structure and a two-dimensional object on a surface of said physical structure.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. An RFID reader comprising:
   at least one processor that:
      responsive to receiving a user interface action, captures an image of at least one part of a physical structure using an imaging device, the physical structure supporting items to be scanned by the RFID reader;
      responsive to locating optical decodable indicia within said image, decodes said optical decodable indicia into a message comprising an identifier identifying said physical structure;
      retrieves from a database, using said identifier identifying said physical structure, at least one of: a reference image of said physical structure and a description of said physical structure; and
      while being moved to follow an imaginary trajectory within said physical structure, performs the following steps:
         (i) capturing an image of said physical structure using said imaging device;
         (ii) responsive to identifying one or more objects within each captured image, determining an orientation and a current spatial position of said RFID reader relative to said physical structure;
         (iii) displaying on said display an RFID scan trace point defined by an intersection of a coverage shape of an RF signal transmitted by said RFID reader and a chosen plane intersecting said physical structure.

2. The RFID reader of claim 1, wherein said decodable indicia is provided by a bar code.

3. The RFID reader of claim 1, wherein said message further comprises a description of said physical structure.

4. The RFID reader of claim 1, further configured, responsive to retrieving said description of said physical structure from said database, to determine and store in memory own spatial position as a point of origin.

5. The RFID reader of claim 1, that, responsive to retrieving said reference image of said physical structure from said database, displays said image on a display.

6. The RFID reader of claim 1, that identifies said one or more objects within each captured image based on comparing said captured image to at least one of: said reference image of said physical structure and said description of said physical structure.

7. The RFID reader of claim 1, that determines said orientation and said current spatial position of said RFID reader relative to said physical structure based on comparing two or more subsequently captured images of said physical structure.

8. The RFID reader of claim 1, that determines said orientation and said current spatial position of said RFID reader relative to said physical structure based on estimated distance to said physical structure.

9. The RFID reader of claim 1, wherein said one or more objects are provided by at least one of: an edge of said physical structure and a two-dimensional object on a surface of said physical structure.

10. The RFID reader of claim 1, wherein said database is provided by one of: a local database and a remote database residing on an external computer.

11. The RFID reader of claim 1, that displays said RFID scan trace overlaid over an image of said physical structure.

12. A method of displaying a visual RFID scan trace by a RFID reader, said method comprising:
  orienting said RFID reader so that at least one part of a physical structure sustaining a plurality of inventory items appears in a field of view of an imaging device;
  said RFID reader, responsive to receiving a user interface action, capturing an image of at least one part of a physical structure using said imaging device;
  said RFID reader, responsive to locating optical decodable indicia within said image, decoding said optical decodable indicia into a message comprising an identifier of said physical structure;
  said RFID reader retrieving from a database, using said identifier of said physical structure, at least one of: a reference image of said physical structure and a description of said physical structure;
  said RFID reader, while being to follow an imaginary trajectory within said physical structure, performing the following steps:
    (i) capturing an image of said physical structure using said imaging device;
    (ii) responsive to identifying one or more objects within each captured image, determining an orientation and a current spatial position of said RFID reader relative to said physical structure;
    (iii) displaying on a display a scan trace point defined by an intersection of a coverage shape of an RF signal transmitted by said RFID reader and a chosen plane intersecting said physical structure.

13. The method of claim 12, wherein said decodable indicia is provided by a bar code.

14. The method of claim 12, wherein said one or more objects are provided by one more of: an edge of said physical structure and a two-dimensional object on a surface of said physical structure.

15. The method of claim 12, wherein said database is provided by one of: a local database, a remote database residing on an external computer.

16. A method of displaying a visual RFID scan trace by a RFID reader, said method comprising:
  orienting said RFID reader so that at least one part of a physical structure sustaining a plurality of inventory items appears in a field of view of an imaging device;
  responsive to receiving a user interface action, capturing an image of at least one part of a physical structure using said imaging device;
  responsive to locating optical decodable indicia within said image, decoding said optical decodable indicia into a message comprising a description of said physical structure; and
  while following an imaginary trajectory within said physical structure, performing the following steps:
    (i) capturing an image of said physical structure using said imaging device;
    (ii) responsive to identifying one or more objects within each captured image, determining an orientation and a current spatial position of said RFID reader relative to said physical structure;
    (iii) displaying on said display a scan trace point defined by an intersection of a coverage shape of an RF signal transmitted by said RFID reading device and a chosen plane intersecting said physical structure.

17. The method of claim 16, wherein said decodable indicia is provided by a bar code.

18. The method of claim 16, wherein said one or more objects are provided by at least one of: an edge of said physical structure and a two-dimensional object on a surface of said physical structure.

\* \* \* \* \*